United States Patent
Bean

(10) Patent No.: US 7,407,383 B2
(45) Date of Patent: Aug. 5, 2008

(54) APPARATUS AND SYSTEM FOR TEACHING PROPER LETTER SIZING AND SPACING TO AUTISTIC CHILDREN AND OTHERS WITH DEFICIENCIES IN THE AREAS OF VISUAL PROCESSING, MOTOR CONTROL AND/OR SENSORY PROCESSING

(75) Inventor: Cindy Wilson Bean, Highland Park, IL (US)

(73) Assignee: Green Bean Products, Inc., Highland Park, IL (US)

(*) Notice: Subject to any disclaimer, the term of this patent is extended or adjusted under 35 U.S.C. 154(b) by 343 days.

(21) Appl. No.: 11/232,846

(22) Filed: Sep. 22, 2005

(65) Prior Publication Data

US 2006/0078857 A1   Apr. 13, 2006

Related U.S. Application Data

(60) Provisional application No. 60/612,130, filed on Sep. 22, 2004.

(51) Int. Cl.
*G09B 11/00* (2006.01)
(52) U.S. Cl. .................................... 434/162
(58) Field of Classification Search ............. 434/115, 434/117, 162, 163, 164; 33/562, 564, 566
See application file for complete search history.

(56) References Cited

U.S. PATENT DOCUMENTS

| | | | | |
|---|---|---|---|---|
| 2,562,479 A * | 7/1951 | Spikes | ............. | 33/443 |
| 2,913,836 A * | 11/1959 | Strunk | ............. | 434/117 |
| 3,579,867 A * | 5/1971 | Kuhn | ............. | 434/117 |
| 3,633,286 A * | 1/1972 | Maurer | ............. | 434/87 |
| 3,959,894 A * | 6/1976 | Hanson et al. | ............. | 434/117 |
| 4,262,422 A * | 4/1981 | Pass | ............. | 33/41.2 |
| 4,425,095 A * | 1/1984 | Morris | ............. | 434/117 |
| 4,626,219 A * | 12/1986 | Goldreyer | ............. | 434/162 |
| 4,960,382 A * | 10/1990 | Alford | ............. | 434/164 |
| 5,027,523 A * | 7/1991 | MacLeod | ............. | 33/564 |
| 5,337,484 A * | 8/1994 | Cardon | ............. | 33/41.2 |
| 5,616,032 A * | 4/1997 | Keitzer et al. | ............. | 434/117 |
| 6,142,783 A * | 11/2000 | Rocha | ............. | 434/164 |

\* cited by examiner

*Primary Examiner*—Kurt Fernstrom
(74) *Attorney, Agent, or Firm*—Greenberg Traurig LLP

(57) ABSTRACT

The present disclosure relates to the area of assistive technology, and specifically discloses an apparatus and method for teaching proper letter sizing and spacing to autistic children and others having deficiencies in the areas of visual processing, motor control and sensory processing, through the use of a novel writing guide and graduated method for using same.

28 Claims, 14 Drawing Sheets

APPARATUS AND SYSTEM FOR TEACHING PROPER LETTER SIZING AND SPACING TO AUTISTIC CHILDREN AND OTHERS WITH DEFICIENCIES IN THE AREAS OF VISUAL PROCESSING, MOTOR CONTROL AND/OR SENSORY PROCESSING

This application claims priority of the filing date of U.S. provisional patent application 60/612,130, filed 22 Sep. 2004, the complete disclosure of which is hereby expressly incorporated herein by reference.

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE DISCLOSURE

1. The Technical Field

The present invention relates to assistive technologies and in particular a novel writing guide and graduated system for teaching autistic children or others with handwriting difficulties, proper handwriting skills and specifically, proper letter sizing and spacing.

2. The Prior Art

It is observed that autistic children as well as others having deficiencies in the area of visual processing, motor control and sensory processing often experience great difficulty in mastering handwriting, and specifically, handwriting with proper sizing and spacing between letters. While the prior art discloses devices in the form of writing guides, such guides are typically limited to teaching handwriting by limiting the overall height of individual letters and promoting the writing along a generally straight horizontal line, but do not teach or control the sizing and spacing between individually written letters.

Accordingly, it would be desirable to provide an improved apparatus for teaching writing skills that addresses sizing and spacing between individually written letters.

SUMMARY OF THE INVENTION

The present invention comprises, in part, a writing guide for teaching proper letter sizing and spacing to autistic children and others with deficiencies in the areas of visual processing, motor control and sensory processing.

The writing guide comprises a substantially planar top panel having at least one elongated, horizontally extending aperture formed therein. A substantially planar bottom panel is operably associated with the substantially planar top panel, and configured to be aligned therewith, in spaced relation thereto. At least one sheet of writable material is operably configured for insertion between the top panel and the bottom panel, whereupon insertion of the at least one sheet of writable material between the top panel and the bottom panel, indicia may be inscribed upon the at least one sheet of writable material only in the areas of the at least one sheet of writable material exposed by the at least one aperture in the top panel.

In an embodiment of the invention, the at least one elongated, horizontally extending aperture comprises at least two elongated, horizontally extending apertures, vertically spaced apart from one another, and preferably, the at least one elongated, horizontally extending aperture comprises at least three elongated, horizontally extending apertures, vertically spaced apart from one another at regular intervals. In an embodiment of the invention, the at least one elongated, horizontally extending aperture has a rectangular configuration.

The bottom panel is preferably pivotably connected to the top panel. The connection may be a hinge.

At least one registration pin is preferably disposed on an inner surface of the bottom panel and at least one registration aperture is preferably disposed on the at least one sheet of writable material, to enable the at least one sheet of writable material to be positioned in registry with the bottom panel and, in turn, the top panel.

The writing guide further may comprise at least one guide line disposed on the at least one sheet of writable material, positioned so as to be visible through the at least one aperture in the top panel, towards providing guidance for an individual to write indicia on the at least one sheet of writable material through the at least one aperture.

The writing guide may further comprise an intermediate guide panel, operably configured to be disposed between the top panel and the at least one sheet of writable material. The intermediate guide panel may have formed therein at least one row of apertures extending horizontally across the intermediate guide panel, and positioned so as to be aligned with the at least one elongated, horizontally extending aperture in the top panel, when the intermediate guide panel is disposed between the top panel and the at least one sheet of writable material, and aligned with the top panel.

A row of apertures may be provided in the intermediate guide panel, for each elongated, horizontally extending aperture in the top panel. Each aperture in the at least one horizontally extending row of apertures may have a rectangular configuration.

At least one registration pin may be disposed on an inner surface of the bottom panel; and at least one registration aperture may be disposed on the intermediate guide panel, to enable the intermediate guide panel to be positioned in registry with the bottom panel and, in turn, the top panel.

In an embodiment of the invention, the top panel, the bottom panel and the intermediate guide panel each have substantially the same height and width. In an embodiment of the invention, the top panel, the bottom panel and the intermediate guide panel each have a width that is greater than their respective height. In another embodiment of the invention, the top panel, the bottom panel and the intermediate guide panel each have a height that is greater than their respective width.

The present invention also comprises, in part, a method for using a writing guide for teaching proper letter sizing and spacing to autistic children and others with deficiencies in the areas of visual processing, motor control and sensory processing, the method comprising the steps of:

providing a substantially planar top panel having at least one elongated, horizontally extending aperture formed therein;

providing a substantially planar bottom panel operably associated with the substantially planar top panel, and configured to be aligned therewith, in spaced relation thereto; and inserting at least one sheet of writable material operably configured for insertion between the top panel and the bottom panel, whereupon insertion of the at least one sheet of writable material between the top panel and the bottom panel, indicia may be inscribed upon the at least one sheet of writable material only in the areas of the at least one sheet of writable material exposed by the at least one aperture in the top panel.

The method may also comprise the step of providing at least two elongated, horizontally extending apertures, vertically spaced apart from one another.

The method may also comprise the step of providing at least three elongated, horizontally extending apertures, vertically spaced apart from one another at regular intervals.

The step of providing at least one elongated, horizontally extending aperture may further comprise the step of providing the at least one elongated, horizontally extending aperture with a rectangular configuration.

The method may further comprise the step of pivotably connecting the bottom panel to the top panel. The step of pivotably connecting the bottom panel to the top panel may further comprise the step of connecting the bottom panel to the top panel by a hinge.

The method may further comprise the steps of:

providing at least one registration pin disposed on an inner surface of the bottom panel; and disposing at least one registration aperture on the at least one sheet of writable material, to enable the at least one sheet of writable material to be positioned in registry with the bottom panel and, in turn, the top panel.

The method may further comprise the step of:

providing at least one guide line disposed on the at least one sheet of writable material, positioned so as to be visible through the at least one aperture in the top panel, towards providing guidance for an individual to write indicia on the at least one sheet of writable material through the at least one aperture.

The method may further comprise the steps of:

providing an intermediate guide panel, operably configured to be disposed between the top panel and the at least one sheet of writable material, forming on the intermediate guide panel at least one row of apertures extending horizontally across the intermediate guide panel, and positioned so as to be aligned with the at least one elongated, horizontally extending aperture in the top panel, when the intermediate guide panel is disposed between the top panel and the at least one sheet of writable material, and aligned with the top panel.

The method may further comprise the step of providing a row of apertures in the intermediate guide panel, for each elongated, horizontally extending aperture in the top panel.

The method may further comprise the step of providing each aperture in the at least one horizontally extending row of apertures with a rectangular configuration.

The method may further comprise the steps of:

providing at least one registration pin disposed on an inner surface of the bottom panel; and disposing at least one registration aperture on the intermediate guide panel, to enable the intermediate guide panel to be positioned in registry with the bottom panel and, in turn, the top panel.

The method may further comprise the step of configuring the top panel, the bottom panel and the intermediate guide panel to each have substantially the same height and width.

The method may further comprise the step of configuring the top panel, the bottom panel and the intermediate guide panel to each have a width that is greater than their respective height. The method may alternatively comprise the step of configuring the top panel, the bottom panel and the intermediate guide panel to each have a height that is greater than their respective width.

The method preferably further comprises the step of:

prompting a user to inscribe indicia on the at least one sheet of writable material, through the at least one elongated, horizontally extending aperture.

BRIEF DESCRIPTION

Figure 1:
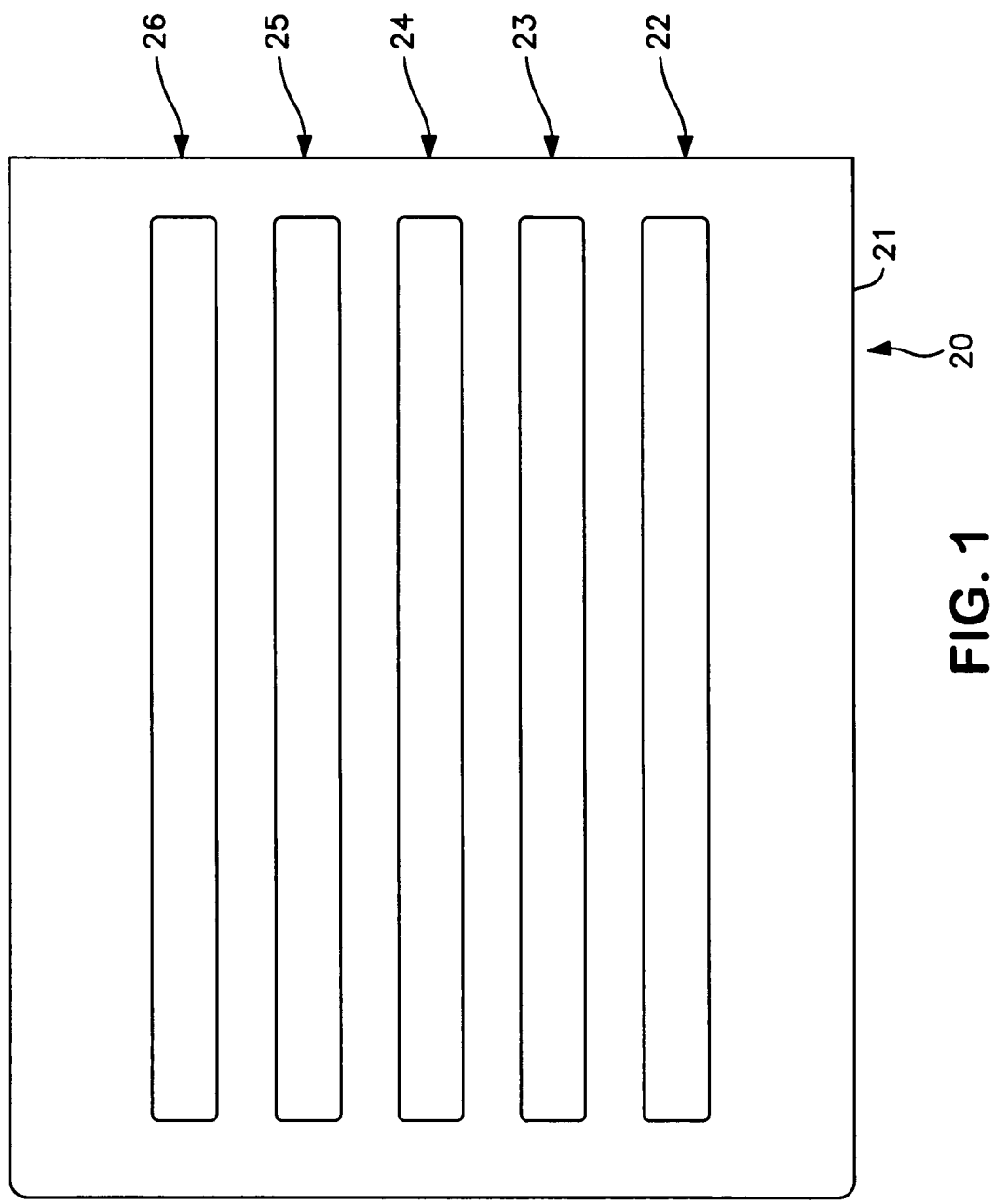
FIG. 1 is a plan view of the top panel portion of a writing guide, according to one embodiment of the present invention, illustrating the parallel horizontally arranged writing apertures.
Figure 1A:
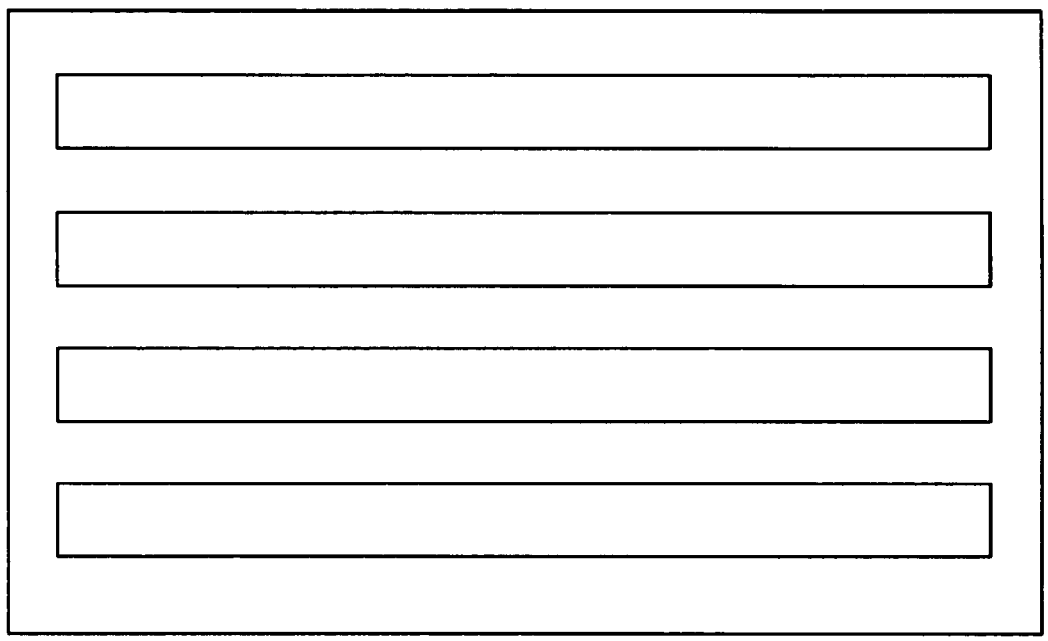
FIG. 1a illustrates an alternative embodiment of the top panel.
Figure 1B:
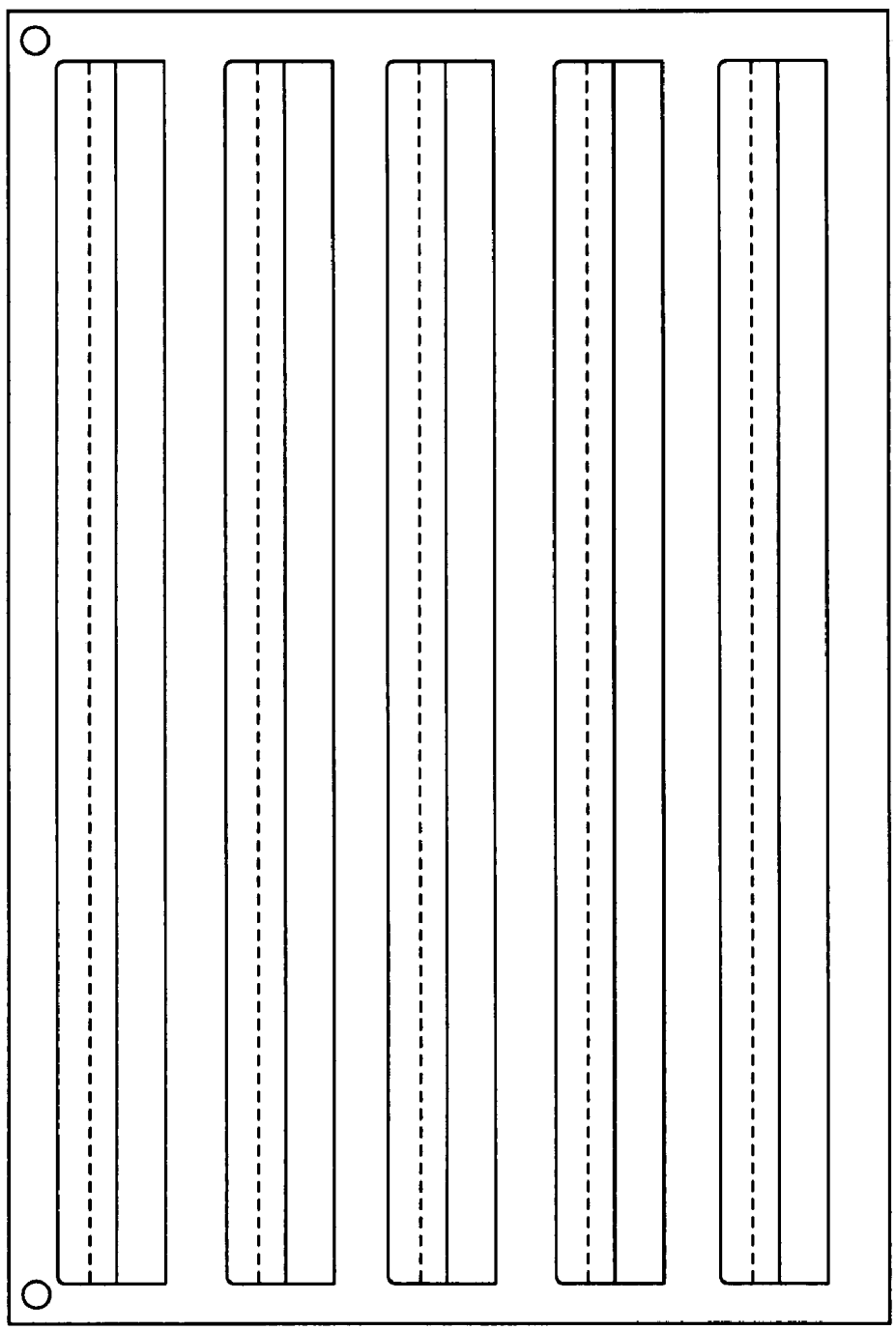
Figure 1C:
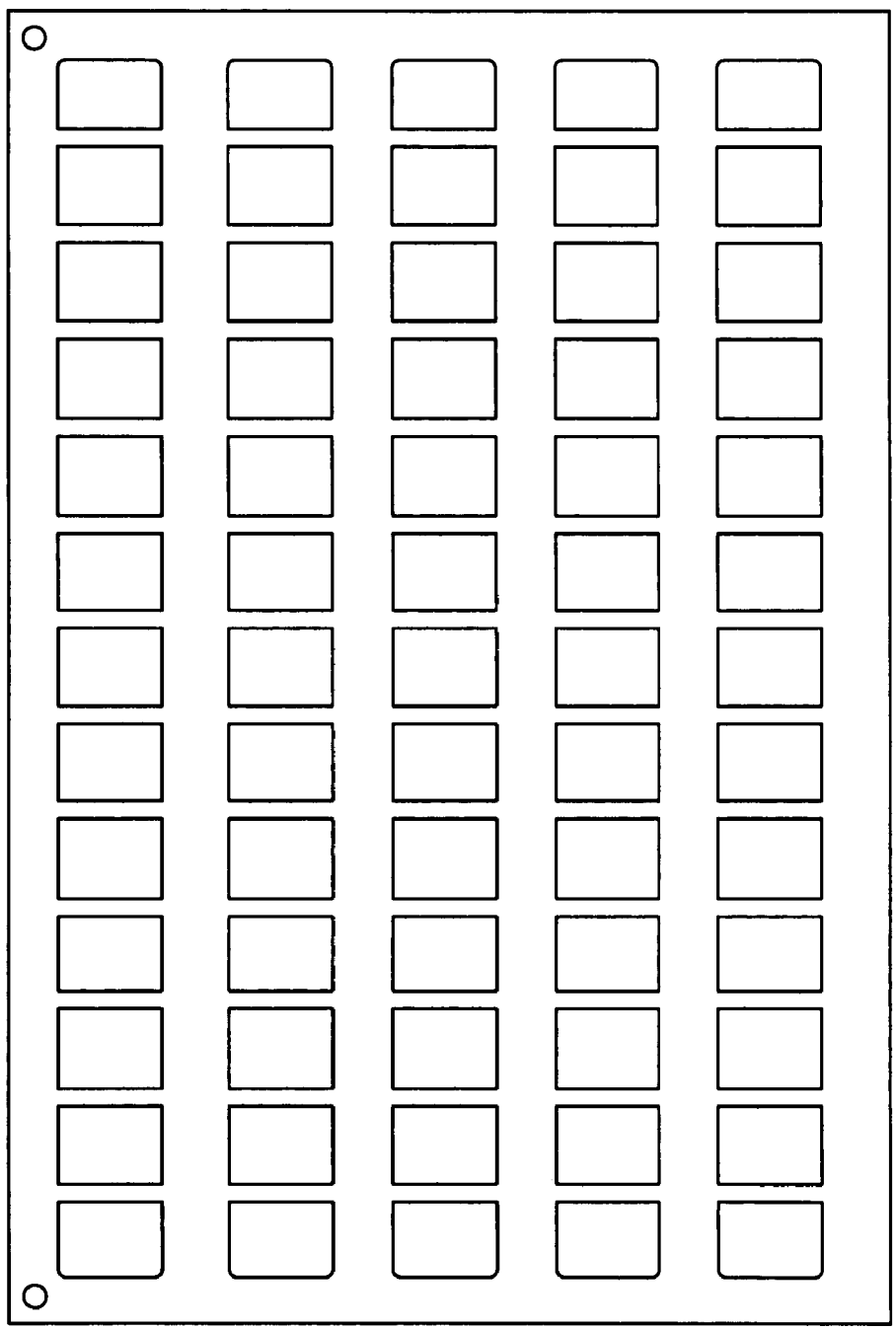
Figure 1D:
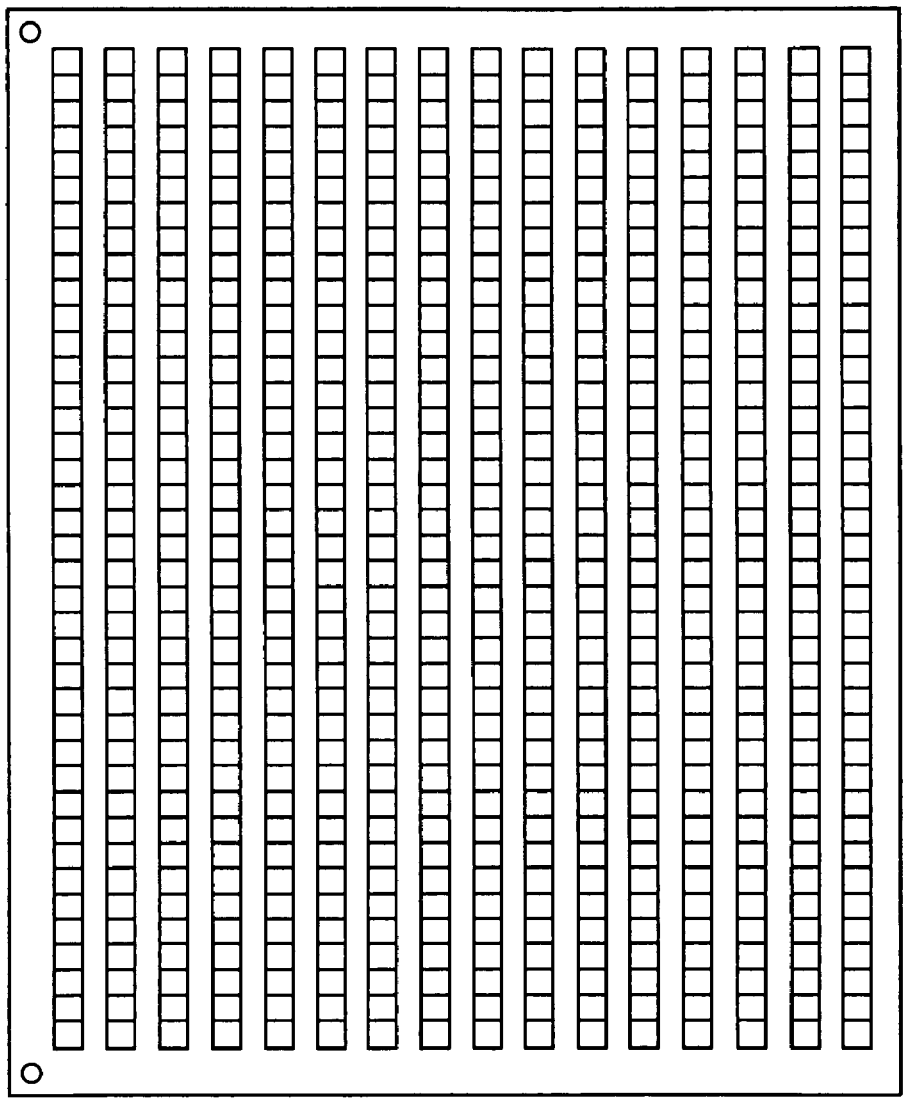

FIG. 1b illustrates a sheet having only horizontal guide lines, for use with or without the insert panel. FIG. 1c illustrates a sheet having a grid of boxes, for use preferably without the insert panel. FIG. 1d illustrates a sheet having a large number of small-sized boxes in closely spaced rows, thus functioning like graph paper.

Figure 2:
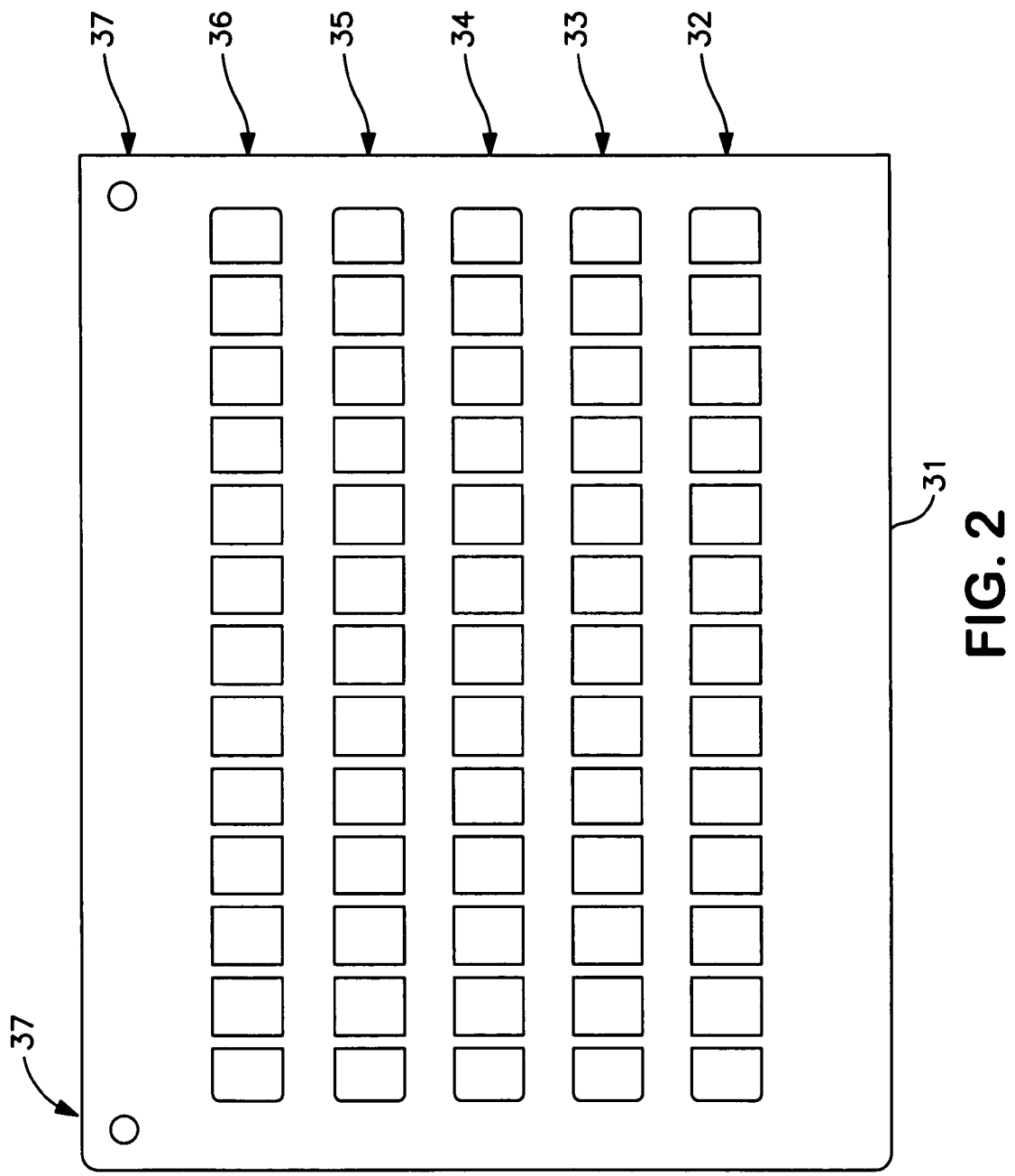

FIG. 2 is a plan view of the insert panel portion of the writing guide of FIG. 1, illustrating the grid of apertures.

Figure 3:
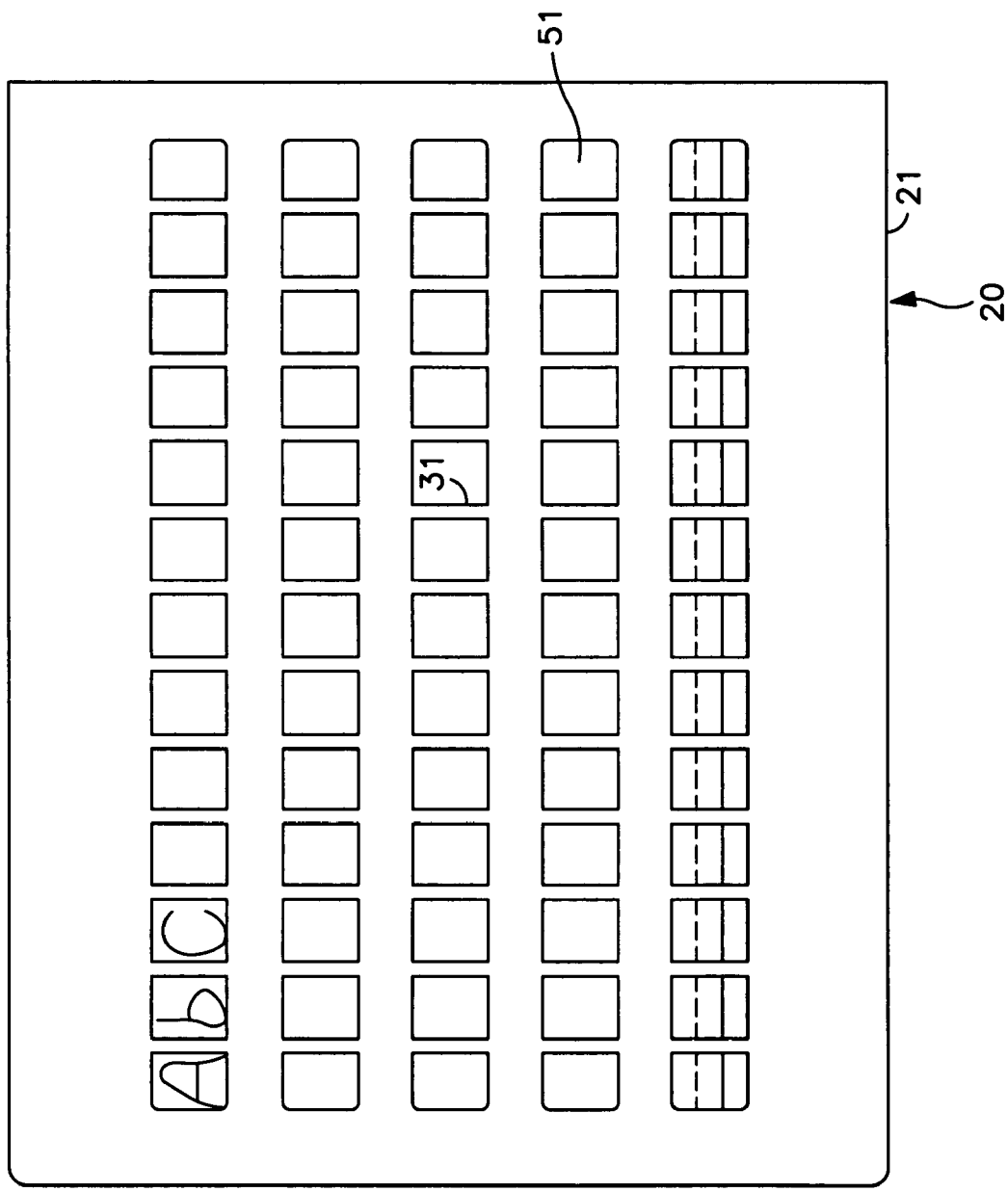

FIG. 3 is a top plan view of the writing guide of FIGS. 1 and 2, illustrating the cooperation of the top panel and the insert panel.

Figure 4:
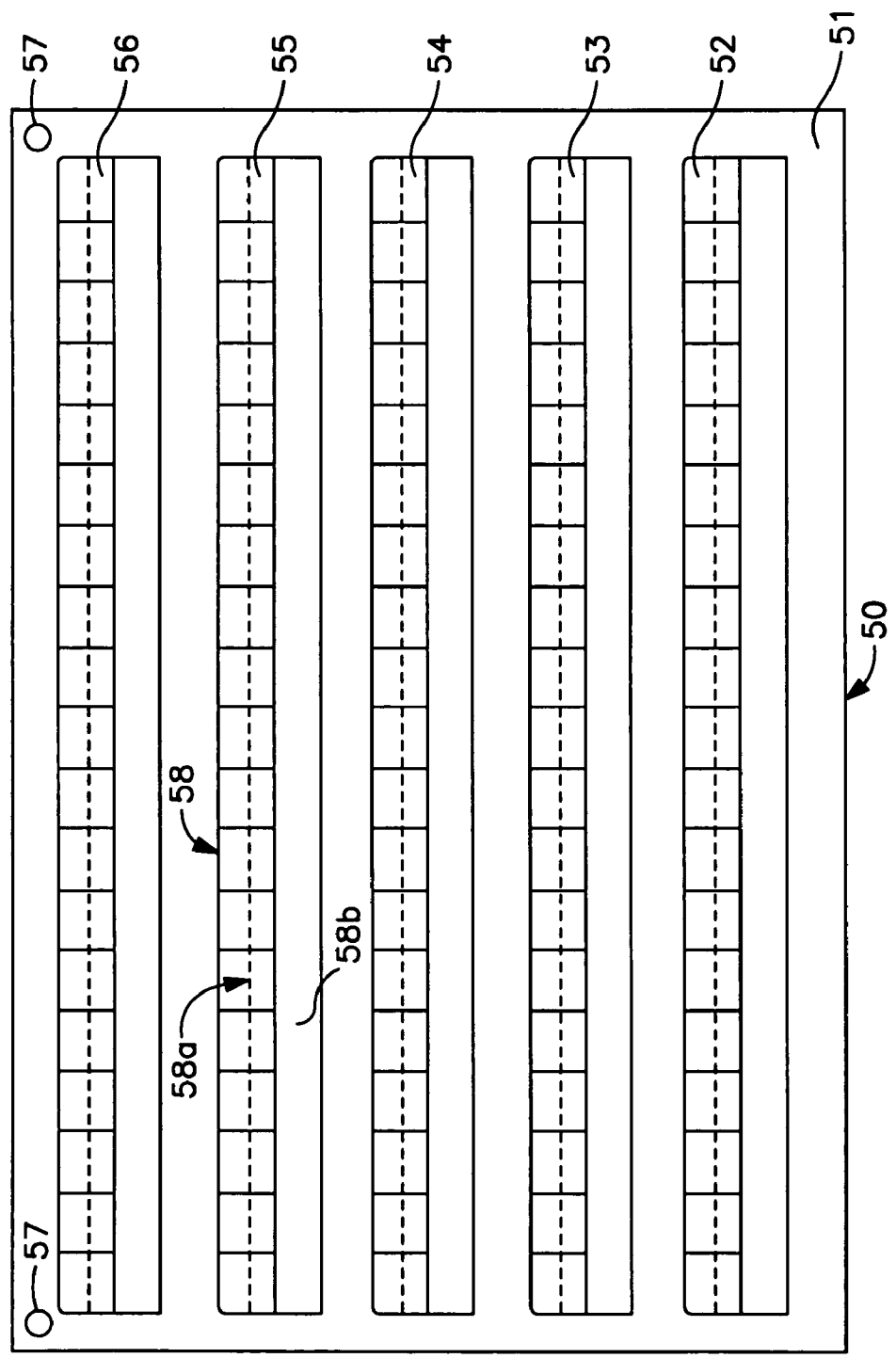

FIG. 4 is a top plan view of a sheet of ruled writing paper designed for use with the writing guide of FIGS. 1-3.

Figure 5:
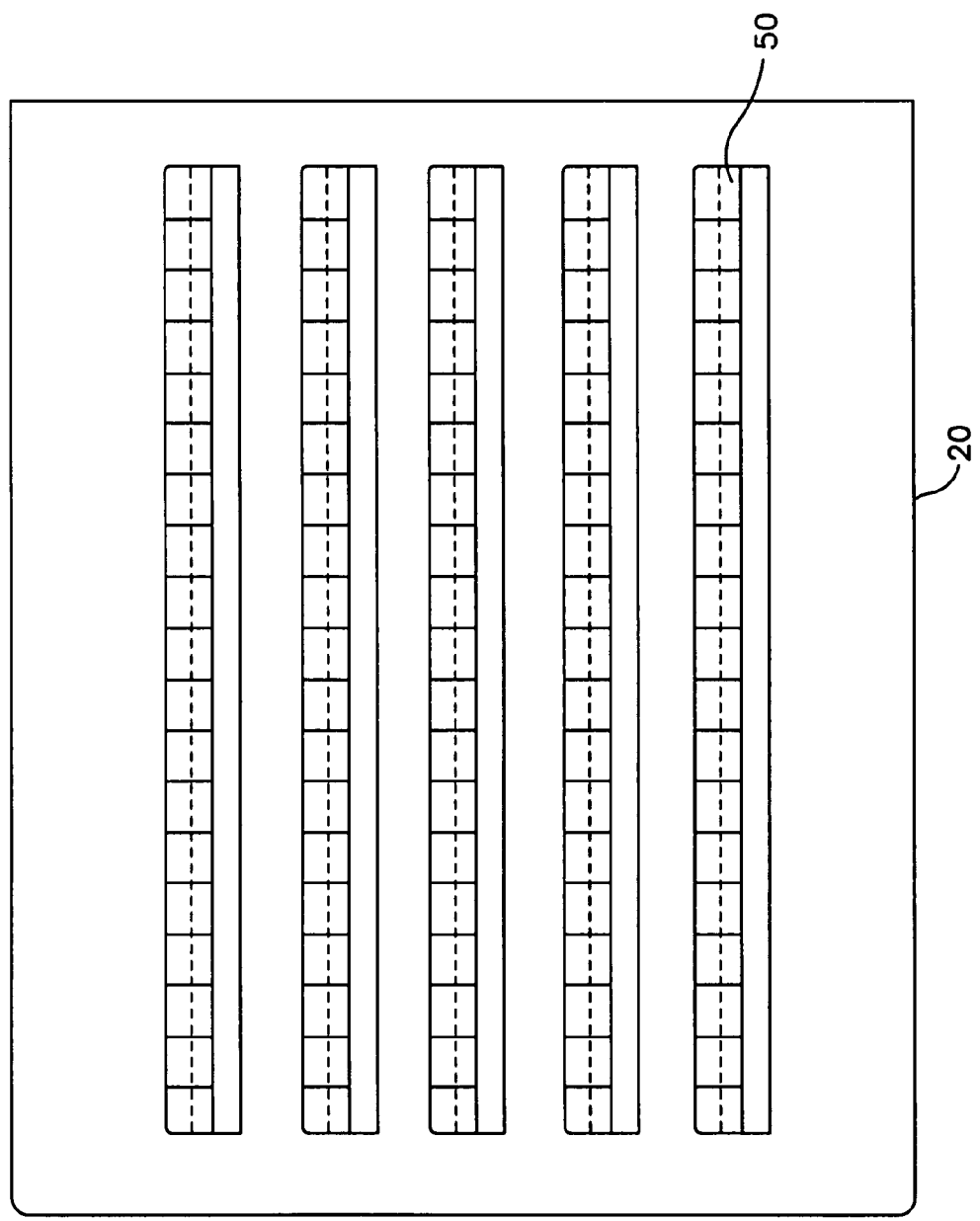

FIG. 5 is a top plan view of the writing guide of FIGS. 1-4, illustrating the cooperation of the top panel and the ruled writing paper of FIG. 4.

Figure 6:
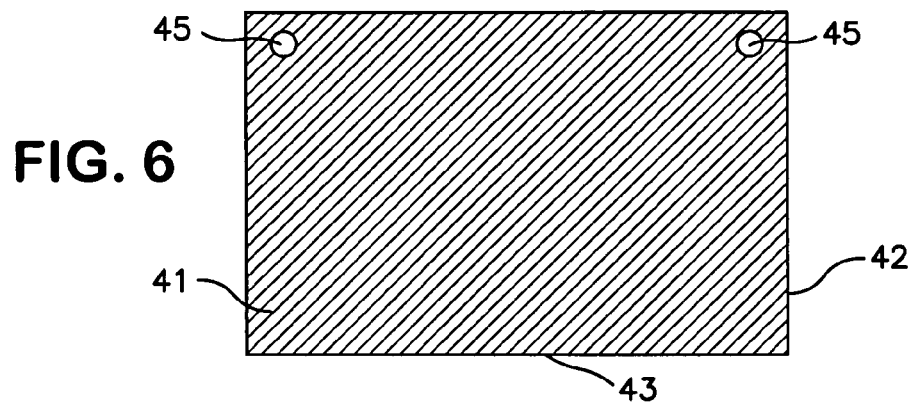

FIG. 6 is a top plan view of the back panel of the writing guide of FIGS. 1-5.

Figure 7:

FIG. 7 is a cross-sectional view of an alternative embodiment of the back panel of the writing guide.

Figure 8:

FIG. 8 is a cross-sectional view of a further alternative embodiment of the back panel of the writing guide.

Figures 9, 10, 11, 12:
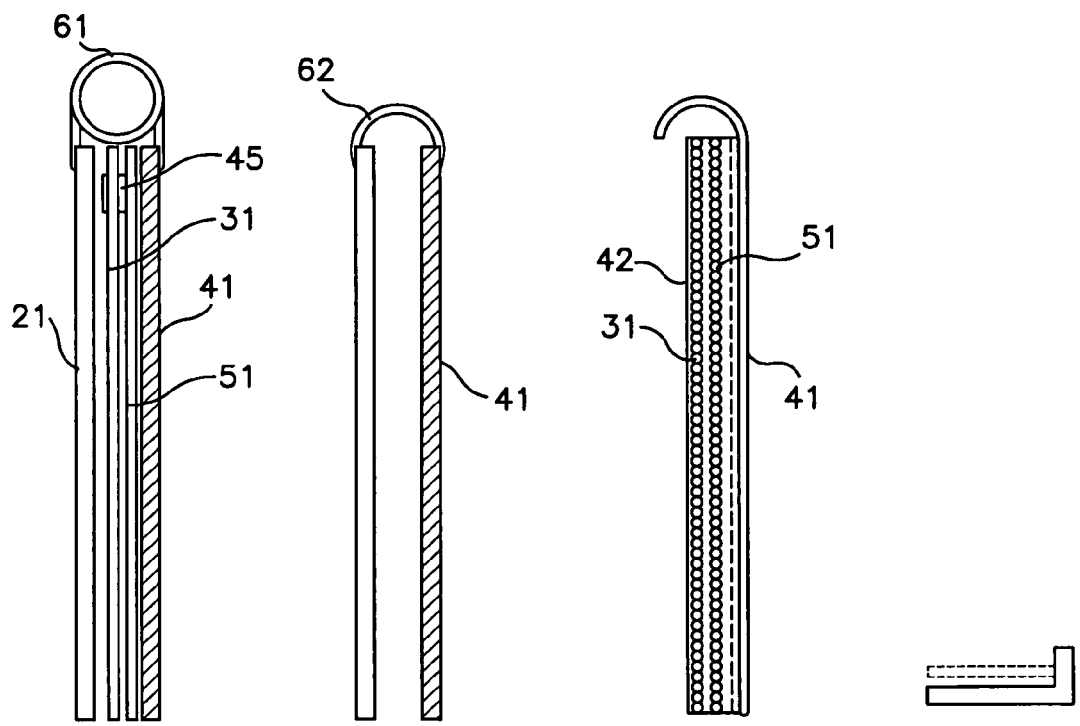

FIG. 9 is a right elevation of the writing guide of the embodiment of FIG. 3.

FIG. 10 is a right elevation of an alternative embodiment of the writing guide, specifically illustrating the use of a tape hinge.

FIG. 11 is a right elevation of another alternative embodiment of the writing guide.

FIG. 12 is a partial front cross-sectional view of an embodiment of the writing guide.

Figure 13:
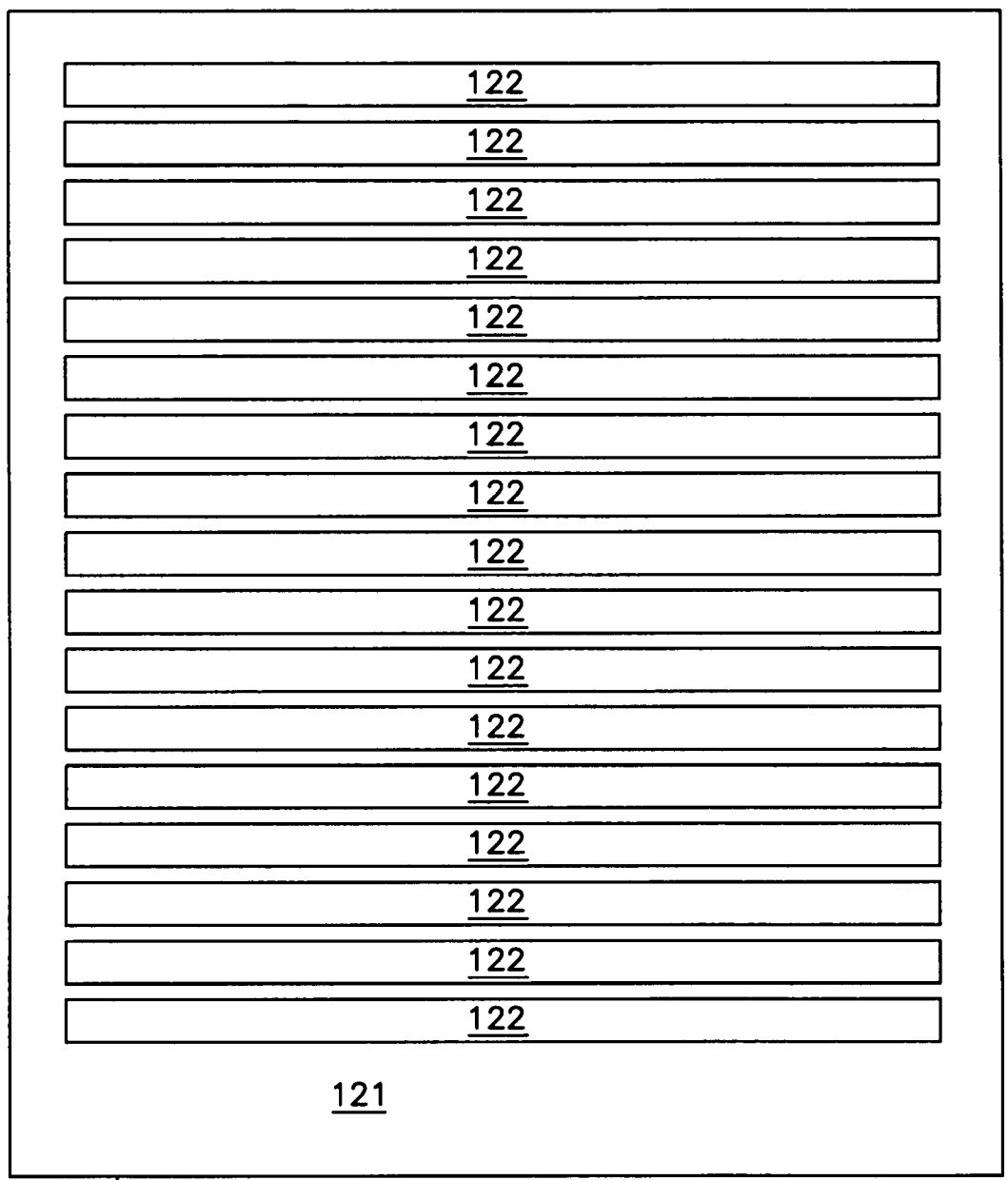

FIG. 13 is a plan view of a top panel for an apparatus according to an alternative embodiment of the invention.

Figure 14:
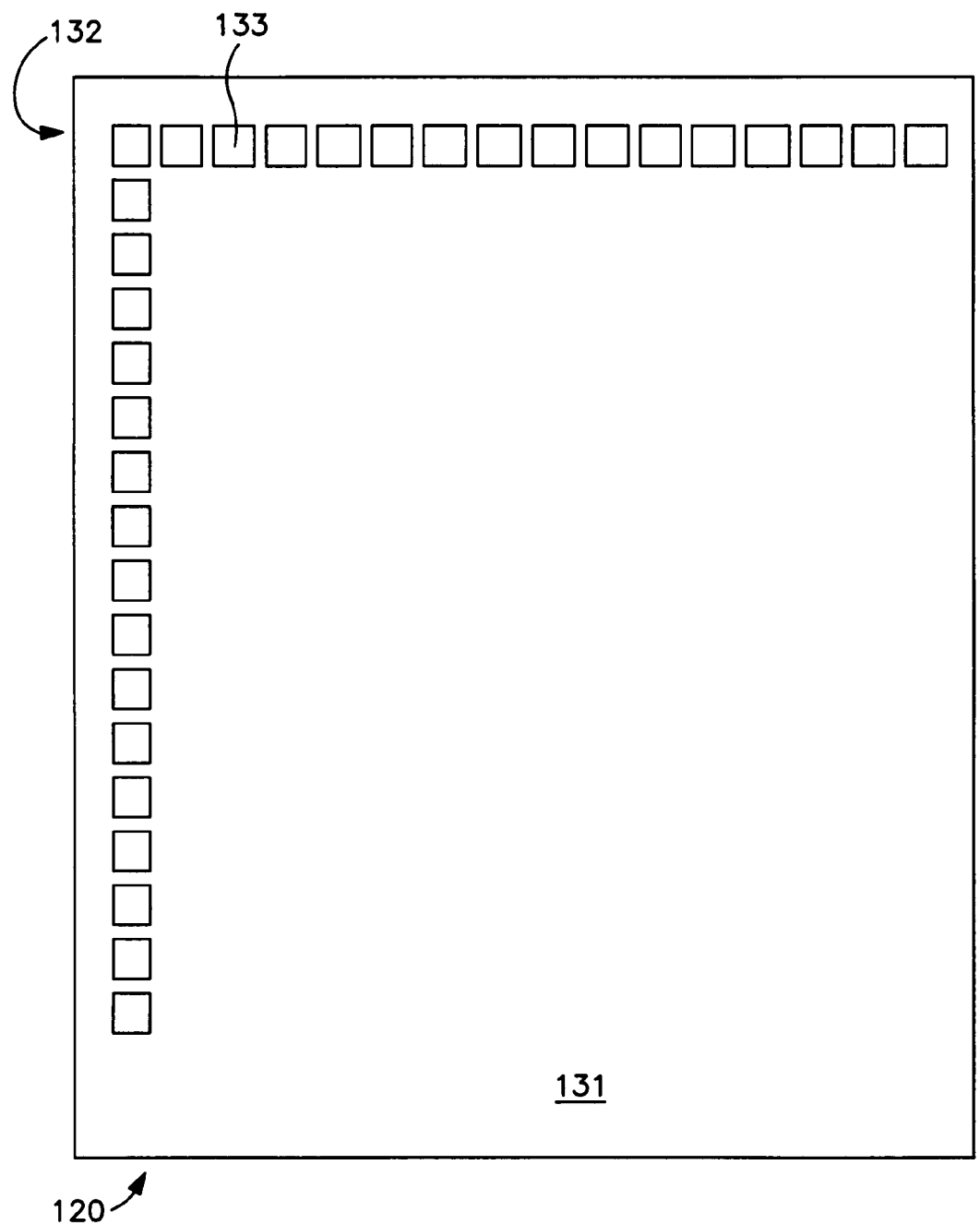

FIG. 14 is a plan view of an insert panel for an apparatus according to an alternative embodiment of the invention.

Figure 15:
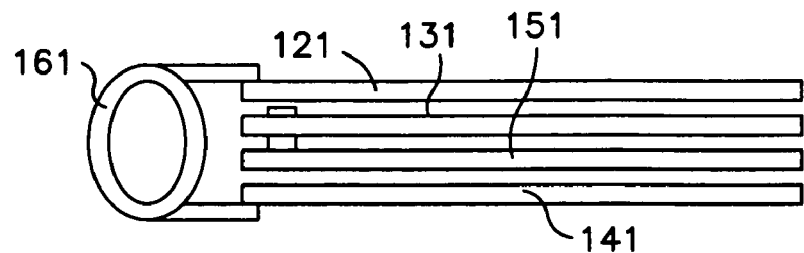

FIG. 15 is a top view of the apparatus according to the embodiment of FIGS. 13-14.

Figure 16:
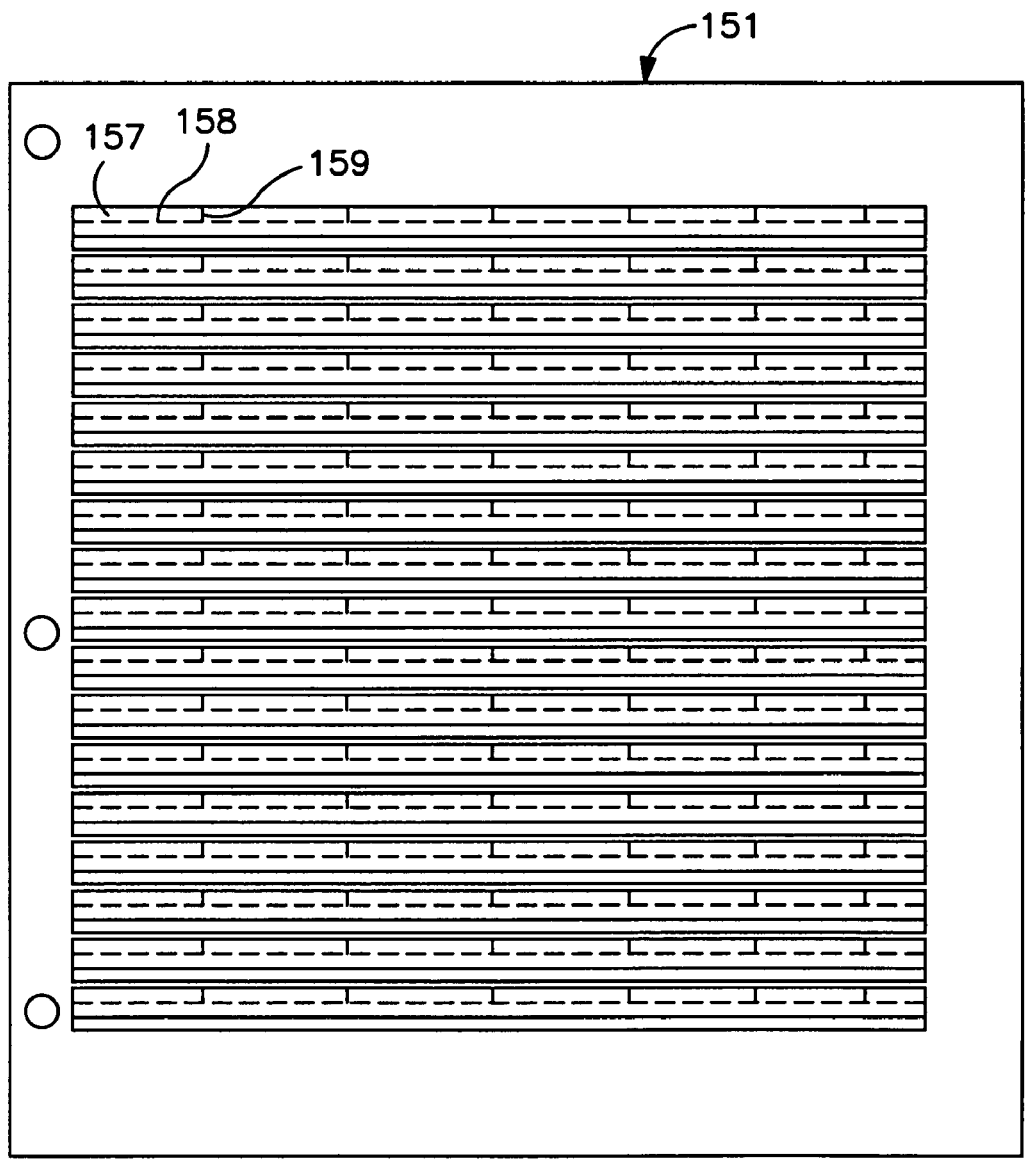

FIG. 16 is a view of a paper sheet for use with the apparatus of the embodiment of FIGS. 13-15.

Figure 17:
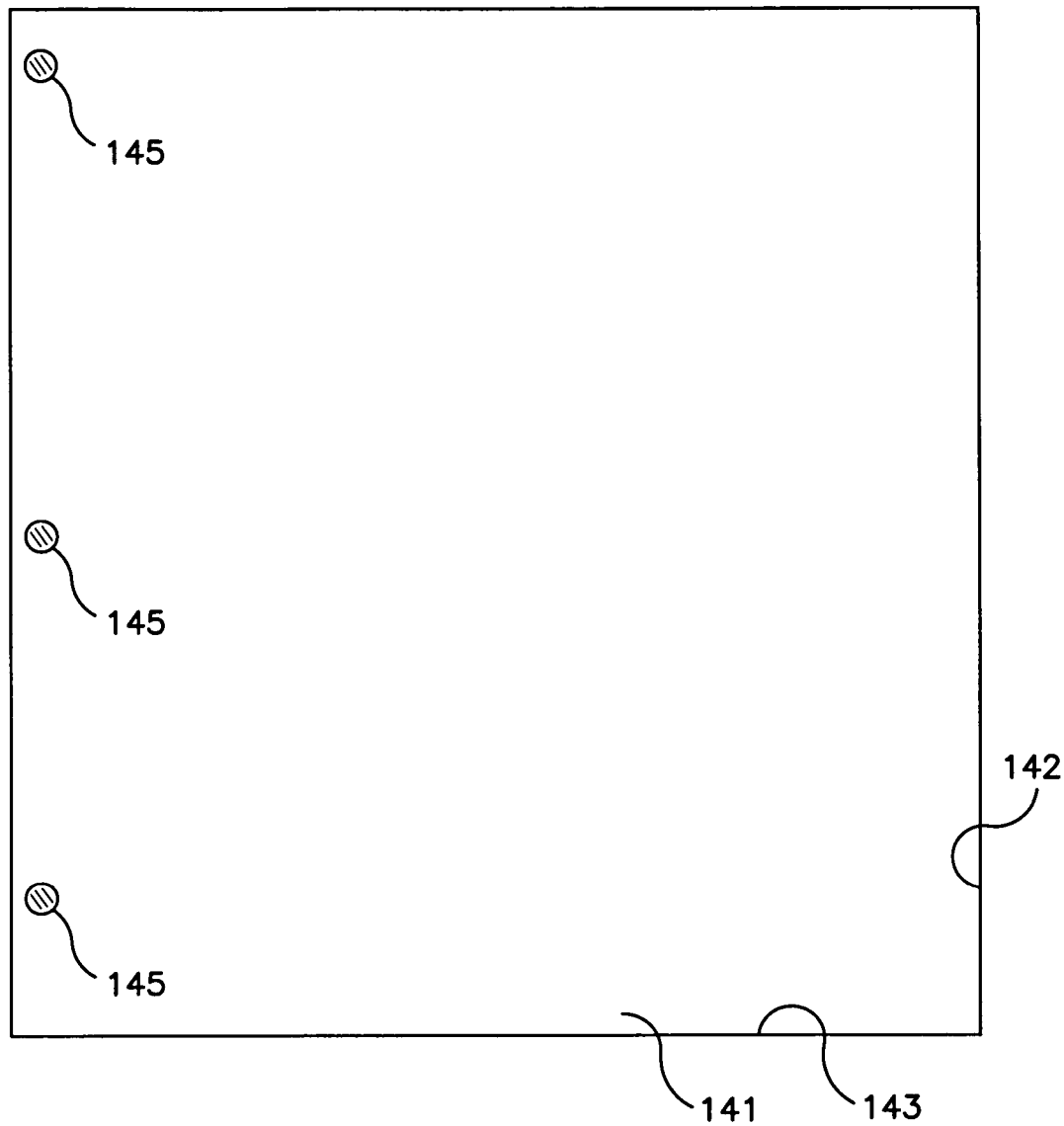

FIG. 17 is a view of a back panel for the apparatus of FIGS. 13-15.

DETAILED DESCRIPTION OF DRAWINGS

While this invention is susceptible of embodiment in many different forms, there are shown in the drawings and will herein be described in detail, preferred embodiments of the invention, with the understanding that the present disclosure should be considered as an exemplification of the principles of the invention and is not intended to limit the invention to the embodiments so illustrated.

Any numerical values or dimensions which are set forth herein are presented solely by way of example of preferred embodiments, and the invention is not intended to be limited thereto, as other embodiments, having other numerical values or dimensions may be developed by those of ordinary skill in the art, without departing from the scope of the invention.

The embodiment of FIGS. 1-12 incorporates a writing guide, with corresponding insert sheets, that are laid out in a configuration commonly referred to as "landscape" (i.e., the guide and sheets have a greater width, from side to side, than their height, from top to bottom).

FIG. 1 illustrates writing guide 20 including top panel 21. Top panel 21 is generally rectangular in shape and includes apertures 22 through 26, each of which extend generally horizontally upon top panel 21. Top panel 21 is preferably fabricated from an opaque material, such as a plastic sheet material. FIG. 9 is a side elevation showing the overall construction of the present invention in the context of top panel 21 adjoined to bottom panel 41 using hinge 61. Insert panel 31 and paper 51, each of which are described in further detail herein, are interposed between top panel 21 and bottom panel 41. As can be seen, the provision of hinge 61 permits top panel 21 to rotate and separate easily from bottom panel 41, permitting the insertion and removal of interposed panels and/or papers as further described herein. In a preferred embodiment of the invention, each of the generally horizontally apertures is preferably ¾" in height and positioned ½ apart from one another. A margin of 2" exists between the uppermost apertures and the uppermost edge of panel 21, with 1¼" existing between the bottom most aperture on the bottom edge of panel 21. Each of the left and right edges of panel 21 are shown separated from the left and right edges of each aperture by 1'. While these dimensions are used for one embodiment of the present invention, different dimensions are of course deemed within the scope of the present invention. By varying the dimensions, a primary age and a secondary age-based apparatus could be provided where the primary aged product has apertures which differ and more closely resemble the rules lines on paper used by different school aged children.

FIG. 2 illustrates insert panel 31 having disposed therein a plurality of generally square apertures positioned in five horizontal rows 32 through 36. Insert panel 31 is likewise preferably fabricated from an opaque sheet material, such as a dark plastic. For purposes of the present illustrated embodiment, apertures appearing in rows 32 through 36 generally correspond to and align with, apertures 22 through 26 when panels 31 and 21 are juxtaposed and aligned with one another. Insert panel 31 also includes apertures 37 for receiving registration posts 45 (described with respect to FIG. 6 hereinafter).

FIG. 3 illustrates an initial mode of operation of the present invention. Insert panel 31 is shown interposed between bottom panel 41 (not shown) and top panel 21. Interposed between insert panel 31 and bottom panel 41 is paper 51 which may be a generally blank sheet of paper, as shown in the first four rows, or alternatively, may comprise a ruled sheet of paper such as that illustrated in FIG. 4, having pre-printed thereon a writing grid comprising five rows of grid markings in rows 52 through 57, each of which generally correspond with and align with the apertures of top panel 21 and those of insert panel 31, when aligned and in registration with one another. As can be seen in FIG. 3, the assembly of top panel 21, insert panel 31 and paper 51 provides an apparatus upon which a child can practice their handwriting in a manner which restricts the ability to write to only those areas formed by the apertures created by the overlap of the respective panels 21 and 31. As illustrated, the letters A, B and C are shown having been written in the uppermost row of FIG. 3.

FIG. 4 illustrates a sheet of paper 51 which contains, in this embodiment, five rows of pre-printed grids. Each row of the pre-printed grids illustrates a number of adjacent cells defined by a series of vertical lines. Through the middle of each cell 58 extends a line 58a defining upper and lower portions of cell 58. Beneath each of cells 58 is a generally horizontal area 58b. Each cell is designed to promote proper letter formation and proper sizing and spacing wherein the letter is generally intended to be written within each cell 58 with line 58a assisting in the formation of the letter in a manner deemed proper assisting in proportions as between upper and lower portions of a given letter with region 58c provided for the descending portion of letter, for example, as the letter "j". Each sheet of paper also includes apertures 57 for the registration posts, described elsewhere herein.

FIGS. 1a-1d illustrate components of alternative embodiments of the invention. FIG. 1a is an alternative embodiment of top panel 21, specifically showing an embodiment wherein four apertures are provided, such as might be desired to teach writing on wider-ruled verses narrow-ruled paper, such as may be appropriate for younger children or those having greater degrees of writing difficulty or impairment. FIGS. 1b-1d illustrate alternative paper sheet configurations, for use with the embodiment of FIGS. 1-12. FIG. 1b illustrates a sheet having only horizontal guide lines, for use with or without the insert panel. FIG. 1c illustrates a sheet having a grid of boxes, for use preferably without the insert panel. FIG. 1d illustrates a sheet having a large number of small-sized boxes in closely spaced rows, thus functioning like graph paper, which may be used without the apparatus.

FIG. 6 illustrates the back panel 41 of the present invention. Back panel 41 is preferably configured as a substantially rectangular shaped panel, which is preferably generally rigid in form and horizontal in shape, corresponding to the outer peripheral shape of top panel 21. Registration pegs 45 are shown operably positioned to the upper left and right most corners of back panel 51, and project slightly outwardly from the uppermost surface of panel 41, as further illustrated in FIG. 9. Raised edges 42 and 43 are further shown positioned along the right most and bottom most edges of panel 41, respectively. Openings may be provided in paper intended for use with the present invention wherein such openings permit the paper to be placed and held upon back panel 41 restricting its movement during writing.

FIGS. 7 and 8 are cross-sectional views of two embodiments of FIG. 6. FIG. 7 illustrates a version of the product where raised edges 42 and 44 are formed projecting upwardly from bottom panel 41 along both the left and right edges of panel 41. Registration pegs 45 are shown emanating upwardly from the uppermost surface of panel 41. Raised edges 42, 43 and 44 serve to substantially retain insert panel 31 and paper 51 within the apparatus during use. It is contemplated that one or more of the various raised panels and/or registration pegs may be used. Registration pegs 45 are intended to be used in connection with panel 31 and paper 51, which have formed therein circular apertures, corresponding to the overall shape of pegs 45 such that insert panel 31 and paper 51 can be positioned on back panel 41 in registration with pegs 45, which serve to preclude movement of the insert panel 31 and paper 51 during use. FIG. 12 further illustrates paper 51 in abutment with raised edge 42 which is shown as restricting movement during the use of the device.

FIG. 9 illustrates the joining of top panel 21 to back panel 41 using a hinge 61, which may be of any suitable configuration, and affixed to top panel 21 and back panel 41 in any suitable manner. Hinge 61 may be replaced by alternative flexible hinge mechanisms, known to those of ordinary skill in the art, which permit movement of top panel 21 in relation to bottom panel 41. For example, a generally flexible tape hinge 62 may be formed by applying flexible adhesive tape along the uppermost edges of panels 21 and 41 to construct a hinge, as shown in FIG. 10. FIG. 11 further illustrates a cross-sectional view of a device omitting top panel 21 from view. In the embodiment illustrated, a raised edge 42 is shown emanating from the right most edge of panel 41. As can be seen, the edge 42 precludes panel 31 and paper 51 from moving any further to the right, the direction in which letters are generally formed when writing in the English language, namely left to right.

The presently illustrated apparatus is designed for use in a graduated manner whereby children use the apparatus components thereof in a manner which progresses in accordance with their developmental skills.

For example upon its initial use the device is preferably configured as shown in FIG. 3 wherein insert panel 31 and lined paper 51 are used to prompt and encourage the student to write letters in a manner where their writing is restricted to those spaces defined by the apertures viewable to the student and further in reliance and use upon the lined or ruled paper 51 which serves to assist proper letter formation. At such time as a student begins to master or otherwise improve in letter sizing, spacing and formation, plain paper may be substituted for ruled paper whereby the registration lines are no longer available to the student. Letter sizing and spacing is nevertheless encouraged and taught via use of the openings formed by the apertures created upon the intersection of various horizontal and vertical portions of the respective top panel 21 and insert panel 31 as illustrated in the upper portion of FIG. 3.

Further at such time as the student masters letter formation, the insert panel 31 may be removed from use as illustrated in FIG. 5. In one embodiment, the lined or ruled paper is substituted for plain paper with the vertical obstructions created through the use of template 31 are omitted. According to the embodiment illustrated in FIG. 5, a student is permitted and encouraged to write letters forming the relative horizontal spacing without being restricted by insert panel 31, but with the aid of ruled paper. At such time as a student begins to master proper letter sizing and spacing the illustration of FIG. 1 may be utilized where only the writing guide formed by top panel 21 is utilized.

Furthermore, it is conceived that if at any time as it is observed that a student requires reinforcement and/or further teaching in association with proper letter sizing and spacing, the apparatus can be easily reconfigured through the use of rule paper, plain paper and/or the insert panel 31 used in connection with the clam shell type device formed by top panel and back panel 21 and 41 respectively.

In yet another embodiment of the present invention it is contemplated that a plastic sheet (such as a clear or translucent plastic sheet, not shown in the drawings) or film coated material (likewise not shown in the drawings) could be substituted for conventional writing paper, so that dry erase markers may be used in place of pens or pencils such that easy erasure is possible. The clear sheet can also be used to facilitate tracing of existing letters, to enable the user to "practice", using the dry erase marker, before writing "permanent" indicia on the paper sheets. Colored sheets of paper may also be used, as it is believed that certain individuals may demonstrate improved visual attention to brightly colored paper, in such colors as bright pink, yellow, light green, light blue or red, for example. Such colored paper may be lined as indicated in the prior examples.

FIGS. 13-17 illustrate an alternative embodiment of the invention, wherein the writing guide and writing sheets are oriented in portrait configuration (height from top to bottom is greater than the width from side to side), as opposed to the landscape configuration of the embodiment of FIGS. 1-12. In the embodiment of FIGS. 13-17, elements having structures and/or modes of operation similar to analogous elements in the embodiment of FIGS. 1-12 are provided with like reference numerals incremented by 100. It is to be understood that the general principles of operation of the present invention are the same in both the embodiment of FIGS. 1-12 and the embodiment of FIGS. 13-17. Accordingly, in the interests of brevity, not every illustration set forth in FIGS. 1-12 is reiterated in FIGS. 13-17, as one of ordinary skill in the art having the disclosure before them, will readily appreciate the structures and modes of operation of the embodiment of FIGS. 13-17.

FIG. 13 illustrates writing guide 120 including top panel 121. Top panel 121 is shown generally rectangular in shape and including a plurality of apertures 122, each of which extend generally horizontally upon top panel 121. FIG. 15 is a top elevation showing the overall construction of the present invention in the context of top panel 121 adjoined to bottom panel 141 using hinge 161. Shown interposed between top panel 121 and bottom panel 141 is insert panel 131 and paper 151 which are each described in further detail herein. As can be seen, the provision of hinge 161 permits top panel 121 to rotate and separate easily from bottom panel 141 permitting the insertion and removal of interposed panels and/or papers as further described herein.

FIG. 14 illustrates insert panel 131 which is shown comprising insert panel 131 having disposed therein a plurality of generally square apertures 133 positioned in seventeen (17) horizontal rows 132, of which only the top row is illustrated in its entirety, with the remaining rows represented by just the first aperture 133 in each row. For purposes of the present illustrated embodiment, apertures appearing in rows 132 generally correspond to and align with, apertures 122 when panels 131 and 121 are juxtaposed and aligned with one another.

The embodiment of FIGS. 13-17, is understood to incorporate an initial mode of operation of the present invention, analogous to that described and illustrated herein with respect to the embodiment of FIGS. 1-12, particularly FIGS. 3 and 4. Insert panel 131 may be interposed between bottom panel 141 and top panel 120. Paper 151, which may be interposed between insert panel 131 and bottom panel 141, may be a generally blank sheet of paper, or alternatively, may comprise a ruled sheet of paper, having pre-printed thereon a writing grid comprising rows of grid markings, each of which generally correspond with and align with the apertures of top panel 121 and those of insert panel 131, when aligned and in registration with one another. The assembly of top panel 121, insert panel 131 and paper 151 can provide an apparatus upon which a child can practice their handwriting in a manner which restricts the ability to write to only those areas formed by the apertures created by the overlap of the respective panels 121 and 131. line 158 defining an upper and lower portion of cell 157. Beneath each of cells 157 is a generally horizontal area 159. Each cell is designed to promote proper letter formation and proper sizing and spacing wherein the letter is generally intended to be written within each cell 157 with line 158 assisting in the formation of the letter in a manner deemed proper assisting in proportions as between an upper and lower portion of a given letter with region 159 provided for the descending portion of letter, just as the letter "j".

In alternative embodiments of top panel 121, greater or lesser numbers of horizontally extending, vertically spaced apertures may be provided, such as might be desired to teach writing on narrower or wider ruled paper. By varying the dimensions, and the numbers of apertures, a primary age and a secondary age-based apparatus could be provided where the primary aged product has apertures which differ and more closely resemble the rules lines on paper used by different school aged children.

FIG. 17 illustrates back panel 141 of the present invention. Back panel 141 is preferably in the form of a substantially rectangular shaped panel that is generally rigid in form and vertical in orientation, corresponding to the outer peripheral shape of top panel 121. Registration pegs 145 are shown operably positioned to the upper left, center left, and lower left areas of back panel 141, and project slightly outwardly from the uppermost surface of panel 141, as further illustrated in FIG. 15. Raised edges 142 and 143 are further shown positioned along the right most and bottom most edges of panel 141, respectively. Openings may be provided in paper intended for use with the present invention wherein such openings permit the paper to be placed and held upon back panel 141 restricting its movement during writing.

In alternative embodiments of the invention, the raised edges may be formed projecting upwardly from bottom panel 141 along both the left and right edges of panel 141. The raised edges, in whichever embodiment, serve to substantially retain insert panel 131 and paper 151 within the apparatus during use. In alternative embodiments of the invention, different combinations and variations of the raised edges and registration pegs described and illustrated herein may be used. For example, registration pegs 145 are intended to be used in connection with panels 131 and paper 151, which have formed therein a corresponding circular shaped apertures corresponding to the overall shape of pegs 145 such that the panel and paper are positioned upon back panel 41 in registration with pegs 145 which serve to preclude movement of the insert panel 131 and paper 151 during use.

The presently illustrated apparatus is designed for use in a graduated manner whereby children use the apparatus components thereof in a manner which progresses in accordance with their developmental skills.

The methods of use of the apparatus of FIGS. 13-17, apart from the dimensional and proportional differences, are substantially identical to that of the embodiments of FIGS. 1-12, would be readily understood as such by one of ordinary skill in the art having the present disclosure before them, and therefore do not need to be set out in detail herein, in order for a complete understanding of the invention.

While in the embodiments described hereinabove, in the "landscape" embodiment of FIGS. 1-12 the hinge is described as connecting the top edges of the top and bottom panels, and in the "portrait" embodiment of FIGS. 13-17 the hinge is described as connecting the side (left side, in particular) edges of the top and bottom panels, it is to be understood that the hinge (or analogous) structure may be positioned anywhere as desired, in either embodiment, be it the top edges, one of the side edges or the bottom edges, of the top and bottom panels, without departing from the scope of the invention.

Among the many benefits achieved by use of the present invention are:

A portable hinged assembly of a top panel having horizontally orientated writing areas and a solid back panel accepts the insertion of writing paper as well as an insert panel.

The present invention can be used with plain or ruled paper as well as a plastic sheet enabling use of white board markers.

The cooperation of the top panel and the insert panel creates discrete areas for writing individual letters toward teaching proper letter sizing and spacing. The insert panel can be removed once a certain proficiency is achieved to permit the user greater freedom in writing while still being constrained by the writing areas provided in the top panel.

Accordingly, the present invention comprises a novel apparatus and graduated method for teaching proper letter sizing and spacing to children and adults.

It is further observed that the present invention has great utility in fostering inclusion of autistic or other developmentally challenged students in the classroom, easing the teacher's burden and permitting the student to meet teacher expectations in the area of handwriting. It is also beneficial to others with neurological conditions resulting in deficient fine motor control and those with reduced vision. The confines provide a motor feedback lending a degree of motor control to the user.

The foregoing description and drawings merely explain and illustrate the invention, and the invention is not so limited as those skilled in the art who have the disclosure before them will be able to make modifications and variations therein without departing from the scope of the invention.

What is claimed is:

1. A writing guide for teaching proper letter sizing and spacing to autistic children and others with deficiencies in the areas of visual processing, motor control an sensory processing, the writing guide comprising:
   a substantially planar top panel having at least one elongated, horizontally extending aperture formed therein;
   a substantially planar bottom panel operably associated with the substantially planar top panel, and configured to be aligned therewith, in spaced relation thereto; and
   at least one sheet of writable material operably configured for insertion between the top panel and the bottom panel, whereupon insertion of the at least one sheet of writable material between the top panel and the bottom panel, indicia may be inscribed upon the at least one sheet of writable material only in the areas of the at least one sheet of writable material exposed by the at least one aperture in the top panel;
   an intermediate guide panel, operably configured to be disposed between the top panel and the at least one sheet of writable material,
   the intermediate guide panel having formed therein at least one row of apertures extending horizontally across the intermediate guide panel, and positioned so as to be aligned with the at least one elongated, horizontally extending aperture in the top panel, when the intermediate guide panel is disposed between the top panel and the at least one sheet of writable material, and aligned with the top panel.

2. The writing guide according to claim 1, wherein the at least one elongated, horizontally extending aperture comprises at least two elongated, horizontally extending apertures, vertically spaced apart from one another.

3. The writing guide according to claim 1, wherein the at least one elongated, horizontally extending aperture comprises at least three elongated, horizontally extending apertures, vertically spaced apart from one another at regular intervals.

4. The writing guide according to claim 1, wherein the bottom panel is pivotably connected to the top panel.

5. The writing guide according to claim 1, wherein the bottom panel is connected to the top panel by a hinge.

6. The writing guide according to claim 1, further comprising:
- at least one registration pin disposed on an inner surface of the bottom panel; and
- at least one registration aperture disposed on the at least one sheet of writable material, to enable the at least one sheet of writable material to be positioned in registry with the bottom panel and, in turn, the top panel.

7. The writing guide according to claim 1, further comprising:
- at least one guide line disposed on the at least one sheet of writable material, positioned so as to be visible through the at least one aperture in the top panel, towards providing guidance for an individual to write indicia on the at least one sheet of writable material through the at least one aperture.

8. The writing guide according to claim 1, wherein a row of apertures is provided in the intermediate guide panel, for each elongated, horizontally extending aperture in the top panel.

9. The writing guide according to claim 1, further comprising:
- at least one registration pin disposed on an inner surface of the bottom panel; and
- at least one registration aperture disposed on the intermediate guide panel, to enable the intermediate guide panel to be positioned in registry with the bottom panel and, in turn, the top panel.

10. The writing guide according to claim 1, wherein the top panel, the bottom panel and the intermediate guide panel each have a width that is greater than their respective height.

11. The writing guide according to claim 1, wherein the top panel, the bottom panel and the intermediate guide panel each have a height that is greater than their respective width.

12. The writing guide according to claim 1, wherein each aperture in the at least one horizontally extending row of apertures has a rectangular configuration.

13. The writing guide according to claim 1, wherein the top panel, the bottom panel and the intermediate guide panel each have substantially the same height and width.

14. A method for using a writing guide for teaching proper letter sizing and spacing to autistic children and others with deficiencies in the comprising the steps of:
- providing a substantially planar top panel having at least one elongated, horizontally extending aperture formed therein:
- providing a substantially planar bottom panel operably associated with the substantially planar top panel, and configured to be aligned therewith, in spaced relation thereto; and
- inserting at least one sheet of writable material operably configured for insertion between the top panel and the bottom panel, whereupon insertion of the at least one sheet of writable material between the top panel and the bottom panel, indicia may be inscribed upon the at least one sheet of writable material only in the areas of the at least one sheet of writable material exposed by the at least one aperture in the top panel;
- providing an intermediate guide panel, operably configured to be disposed between the top panel and the at least one sheet of writable material,
- forming on the intermediate guide panel at least one row of apertures extending horizontally across the intermediate guide panel, and positioned so as to be aligned with the at least one elongated, horizontally extending aperture in the top panel, when the intermediate guide panel is disposed between the top panel and the at least one sheet of writable material, and aligned with the top panel.

15. The method according to claim 14, wherein the step of providing at least one elongated, horizontally extending aperture comprises the step of providing at least two elongated, horizontally extending apertures, vertically spaced apart from one another.

16. The method according to claim 14, wherein the step of providing at least one elongated, horizontally extending aperture comprises the step of providing at least three elongated, horizontally extending apertures, vertically spaced apart from one another at regular intervals.

17. The method guide according to claim 14, wherein the step of providing at least one elongated, horizontally extending aperture further comprises the step of providing the at least one elongated, horizontally extending aperture with a rectangular configuration.

18. The method according to claim 14, further comprising the step of pivotably connecting the bottom panel to the top panel.

19. The method according to claim 14, further comprising the step of connecting the bottom panel to the top panel by a hinge.

20. The method according to claim 14, further comprising the steps of:
- providing at least one registration pin disposed on an inner surface of the bottom panel; and
- disposing at least one registration aperture on the at least one sheet of writable material, to enable the at least one sheet of writable material to be positioned in registry with the bottom panel and, in turn, the top panel.

21. The method according to claim 14, further comprising the step of:
- providing at least one guide line disposed on the at least one sheet of writable material, positioned so as to be visible through the at least one aperture in the top panel, towards providing guidance for an individual to write indicia on the at least one sheet of writable material through the at least one aperture.

22. The method according to claim 14, further comprising the step of providing a row of apertures in the intermediate guide panel, for each elongated, horizontally extending aperture in the top panel.

23. The method according to claim 14, further comprising the step of providing each aperture in the at least one horizontally extending row of apertures with a rectangular configuration.

24. The method according to claim 14, further comprising the step of:
- providing at least one registration pin disposed on an inner surface of the bottom panel; and
- disposing at least one registration aperture on the intermediate guide panel, to enable the intermediate guide panel to be positioned in registry with the bottom panel and, in turn, the top panel.

25. The method according to claim 14, further comprising the step of:
- prompting a user to inscribe indicia on the at least one sheet of writable material, through the at least one elongated, horizontally extending aperture.

26. The method according to claim 14, further comprising the step of configuring the top panel, the bottom panel and the intermediate guide panel to each have substantially the same height and width.

27. The method according to claim 14, further comprising the step of configuring the top panel, the bottom panel and the intermediate guide panel to each have a width that is greater than their respective height.

28. The method according to claim 14, further comprising the step of configuring the top panel, the bottom panel and the intermediate guide panel to each have a height that is greater than their respective width.

* * * * *